United States Patent

[11] 3,615,583

[72] Inventors John C. Bard;
Roman A. Carpenter, both of Madison, Wis.
[21] Appl. No. 825,927
[22] Filed May 19, 1969
[45] Patented Oct. 26, 1971
[73] Assignee Oscar Mayer & Company, Inc.
Chicago, Ill.

[54] METHOD OF PREPARING A WHIPPED MEAT FOOD COMPOSITION AND PRODUCT PRODUCED THEREBY
2 Claims, No Drawings

[52] U.S. Cl. ................................................. 99/108
[51] Int. Cl. ........................................... A22c 18/00
[50] Field of Search .......................................... 99/107, 108, 109, 187, 208

[56] References Cited
UNITED STATES PATENTS

| | | | |
|---|---|---|---|
| 2,681,279 | 6/1954 | Sloan et al. | 99/109 |
| 2,992,116 | 7/1961 | Sair | 99/109 X |
| 3,266,559 | 8/1966 | Osborne et al. | 99/208 X |
| 3,309,204 | 3/1967 | Helmer et al. | 99/109 |

*Primary Examiner*—Hyman Lord
*Attorney*—Greist, Lockwood, Greenalwat & Dewey

ABSTRACT: A whipped meat food product is prepared by intimately blending together in uniform distribution and admixture solid and liquid ingredients including: (1) comminuted meat such as sausage emulsion or meat which constitutes the principal ingredient; (2) water, and animal and/or vegetable fat, which accounts for tne major portion of the balance, and, (3) seasoning or flavoring ingredients including stabilizers constituting less than 10 percent by weight of the total formulation. The blended formulation is preferably pasteurized and homogenized and then chilled, after which sufficient edible gas is incorporated throughout the formulation to increase its volume by at least 15 percent and preferably by at least 20 percent.

METHOD OF PREPARING A WHIPPED MEAT FOOD COMPOSITION AND PRODUCT PRODUCED THEREBY

This invention relates to a whipped meat base food product and method of preparing the same. The product is characterized by being very spreadable at refrigerator temperatures (e.g. 32° F. to 50° F.) as a result of its whipped or fluffy texture, being much more so than a sausage produce such, for example, as ordinary liver sausage. The texture of the product is such that it is particularly useful both as a chip dip and as a spread. Having been pasteurized, the food spread of this invention has excellent shelf life in sealed containers maintained under refrigeration.

The object of the invention generally stated, is the provision of a whipped meat food product characterized by its desirable constituency at refrigerator temperatures for use as a chip dip or spread, and a practical method for preparing the same on a quantity production basis.

The principal ingredient of the dip or spread is a comminuted meat product such as sausage emulsion which has been heat processed or otherwise denatured. A preferred sausage emulsion is liver sausage but other sausage emulsions, or blends thereof, may be used including bologna, wiener and braunschweiger mettwurst. Comminuted cooked beef, pork, ham, lamb, veal, fish, turkey and chicken may also be used. Preferably, the comminuted meat product constitutes approximately 40 to 50 percent by weight of the formulation.

After the comminuted meat ingredient, the major portion of the balance of the formulation consists of water and animal and/or vegetable fat or oil. In addition, seasoning or flavoring ingredients (e.g. salt, sugar or other sweetener, monosodium glutamate, and spices) and stabilizers (e.g. egg yolk, nonfat milk solids, and gelatin) will normally constitute less than 10 percent of the total formulation.

The following specific examples constitute presently preferred embodiments of the invention including the preferred method of preparing the whipped meat food dip or spread.

EXAMPLE 1

| Ingredient | % By Weight |
| --- | --- |
| Braunschweiger liver sausage emulsion | 50.0 |
| Water | 24.9 |
| Corn oil | 13.6 |
| Nonfat milk solids (dried) | 7.0 |
| Salt | 1.7 |
| Sugar | 1.9 |
| Monosodium glutamate | 0.5 |
| Soluble seasoning (e.g. wiener spice) | 0.4 |
| Total | 100.0 |

The foregoing ingredients are intimately and uniformly blended in known manner using commercial blending or mixing equipment. For example, a conventional paddle-type mixer may be used. All of the foregoing ingredients may be introduced into the mixer after which the mixing is commenced and continued until the contents are smooth and uniform. Thereafter, the uniform blend is given a single pass through a colloid mill or shear pump of known commercial type so as to comminute and emulsify (i.e. homogenize) the blend more intimately.

The blend is then pasteurized such as by heating to 160° F. in an open, steam-jacketed kettle. The pasteurized product is next chilled in a suitable piece of equipment to a temperature about 35° F. After chilling, the emulsified blend is whipped in an atmosphere of edible inert gas, preferably nitrogen, so as to increase the volume by about 20 percent. The nitrogen may be incorporated by whipping the emulsified and chilled blend in a commercial horizontal rotor-type ice cream making machine, for example.

Whipping or other means of incorporating nitrogen or other edible gas constitutes the last step in the preparation of the whipped product prior to packaging in suitable containers. For example, it may be sealed in aluminum, plastic or waxed paperboard dishes such as are conventionally used for dips and spreads and then stored under refrigeration at a temperature say 45° F. The resultant product is a fluffy dip or spread which is very easily spreadable and useful as a dip at refrigeration temperatures. The product has the flavor of braunschweiger liver sausage to a marked degree.

EXAMPLE 2

| Ingredient | % By Weight |
| --- | --- |
| Ground Roast Beef (¼" grind) | 40.0 |
| Water | 21.4 |
| Corn Oil | 23.6 |
| Egg Yolk | 8.0 |
| Nonfat Milk Solids | 0.5 |
| Sugar | 1.9 |
| Salt | 1.6 |
| Gelatin | 0.8 |
| Monosodium Glutamate | 0.6 |
| Guar Gum | 0.2 |
| Caramel coloring | 0.5 |
| Soluble Seasoning | 0.9 |
| Total | 100.0 |

The foregoing ingredients may be processed into a whipped roast-beef-flavored dip or spread following the procedure described above in example 1.

EXAMPLE 3

| Ingredient | % By Weight |
| --- | --- |
| Ham, ¼" grind | 45.0 |
| Water | 23.2 |
| Corn Oil | 6.1 |
| Bacon Fat | 6.1 |
| Egg Yolk (10% salted) | 1.8 |
| Nonfat Milk Solids | 6.3 |
| Gelatin | 0.4 |
| Salt | 1.5 |
| Monosodium Glutamate | 0.5 |
| Charcoal Smoke Flavoring | 0.1 |
| Crushed Pineapple (in juice) | 5.0 |
| Brown Sugar | 4.0 |
| Total | 100.0 |

The manufacturing procedure for example 3 was as follows:

A. Mixing Ingredients

This was done in a conventional, paddle-type mixer. The ground ham was first placed in the mixer. The mixer was turned on and the liquid phase of the formula was added followed by the even distribution of the dry ingredients. Mixing was continued for about 5 minutes until a uniform blend was achieved. Temperature of product out of mixer was about 50° F.

B. EMULSIFYING

Mixed formulation was then given a single pass through a Waukesha Model 4 Shear Pump operating at 5,400 r.p.m. with a flow rate of approximately 45 lbs./min. Temperature of product out of pump was about 60° F.

C. Heat Processing

Pasteurization was accomplished by heating the emulsion in a stainless steel, steam-jacketed cook kettle equipped with an agitator and side scrapers. Steam pressure in jacket was set at 25 p.s.i. and approximately 10 –12 minutes was required to raise product temperature to 170°–175° F.

D. CHILLING

Immediately following pasteurization, the product was chilled to a temperature of approximately 70° F. This was done by a single pass through a cold water chilled, Creamery Packaging Co., Model BD 6S, Swept Surface, Heat Exchanger.

E. Whipping

From the heat exchanger, the product is pumped directly into an ammonia-refrigerated, Whipper-Chiller of known type. This unit represents the final step in the manufacturing procedure and both chills and fluffs the product. Nitrogen is whipped into the mixture until the original volume thereof is increased by about 50–60 percent although increases of 65 to 85 percent are readily attainable in this equipment.

EXAMPLE 4

| Ingredient | % By Weight |
| --- | --- |
| Braunschweiger liver sausage | 53.0 |
| Water | 24.0 |
| Corn oil | 5.7 |
| Bacon Fat | 5.7 |
| Egg yolk (10% salted) | 1.7 |
| Nonfat milk solids | 5.9 |
| Gelatin | 0.4 |
| Salt | 0.9 |
| Sugar | 1.8 |
| Monosodium glutamate | 0.5 |
| Soluble seasoning | 0.4 |
| Total | 100.0 |

The foregoing ingredients were processed into a whipped liver-sausage-flavored product following the procedure described above for example 3.

The formulation and method of preparation set forth in the foregoing examples may be varied in any one or more of the following respects:

1. The solid and liquid ingredients may conform to the following general formulation:

| Ingredient | % By Weight |
| --- | --- |
| Comminuted meat material | 40–53 |
| Water | 20–25 |
| Fat (Animal and/or vegetable oil) | 12–25 |
| Nonfat Milk Solids (Dried) | 0–7 |
| Egg Yolk | 0–8 |
| Salt | |
| Sugar | |
| Monosodium Glutamate | total less than 10% |
| Flavoring or Seasoning | |
| Stabilizers | |

2. In place of liver sausage, other sausage emulsions may be used including bologna, wiener and braunschweiger mettwurst. In place of roast beef or ham other cooked meats may be substituted including, pork, lamb, turkey, chicken, fish, etc.

3. In place of corn oil, other vegetable oils may be used including safflower oil, peanut oil, soybean oil, olive oil, cottonseed oil. Bacon fat may be replaced in whole or part by other animal fats such as lard or tallow. A mixture of about equal parts of animal fat (e.g. bacon fat) and vegetable oil e.g. corn oil) yields a product having a very smooth texture and excellent stability.

4. The passage of the blended mixture through a colloid mill or shear pump may be omitted if the initial blending and mixing is sufficiently complete.

5. Pasteurization times may be varied depending on product formulation, packaging and storage conditions.

6. The blended product after pasteurization may be chilled to any temperature between freezing and 60° F.

7. In place of nitrogen, other edible gases including air, carbon dioxide, and nitrous oxide may be introduced or whipped into the pasteurized and chilled product so as to impart the desired fluffiness which converts it into a readily spreadable product. The volume increase above 15 percent may be as much as 100 percent.

Those skilled in the art will appreciate that certain other changes and modifications may be made without departing from the spirit and scope of the invention.

What is claimed as new is:

1. The method of preparing a whipped meat food composition spreadable at a temperature at least as low as 50° F. which comprises intimately blending together in a uniform distribution from about 40 to about 53 percent of comminuted meat material, from about 20 to about 25 percent of added water, from about 12 to about 25 percent of edible fat, and less than 10 percent of flavoring, seasoning, and stabilizer ingredients, pasteurizing the blended formulation, chilling the pasteurized formulation, and uniformly incorporating sufficient edible gas into the chilled formulation to increase its volume at least 15 percent.

2. A whipped meat food composition produced by the method of claim 1.